United States Patent
Hwang et al.

(10) Patent No.: US 8,426,771 B2
(45) Date of Patent: Apr. 23, 2013

(54) METHOD OF MONITORING MACHINE CONDITION

(75) Inventors: Yoha Hwang, Seoul (KR); Jong Min Lee, Gunpo-si (KR)

(73) Assignee: Korea Institute of Science and Technology, Seoul (KR)

( * ) Notice: Subject to any disclaimer, the term of this patent is extended or adjusted under 35 U.S.C. 154(b) by 341 days.

(21) Appl. No.: 12/859,753

(22) Filed: Aug. 19, 2010

(65) Prior Publication Data

US 2011/0192827 A1    Aug. 11, 2011

(30) Foreign Application Priority Data

Feb. 11, 2010  (KR) .................. 10-2010-0012970
Aug. 10, 2010  (KR) .................. 10-2010-0077026

(51) Int. Cl.
*B23K 9/10*        (2006.01)

(52) U.S. Cl.
USPC .............................. 219/130.01; 219/130.33

(58) Field of Classification Search ............. 219/130.01, 219/130.33
See application file for complete search history.

(56) References Cited

U.S. PATENT DOCUMENTS

| 5,291,423 A | | 3/1994 | Röösli | |
|---|---|---|---|---|
| 5,465,321 A | * | 11/1995 | Smyth | ............................ 706/20 |
| 6,064,029 A | | 5/2000 | Choi et al. | |
| 6,583,386 B1 | * | 6/2003 | Ivkovich | .................. 219/130.01 |

FOREIGN PATENT DOCUMENTS

| JP | 2-224877 | 9/1990 |
|---|---|---|
| KR | 10-0259883 | 3/2000 |

OTHER PUBLICATIONS

Hadizadeh et al., Random Texture Defect Detection Using I-D Hidden Markov Models Based on Local Binary Patterns, IEICE Trans. Inf. & Syst., Vol. E91-D, No. 7 (Jul. 2008).

* cited by examiner

*Primary Examiner* — Huan Hoang
(74) *Attorney, Agent, or Firm* — NSIP Law

(57) ABSTRACT

Various embodiments of a method for monitoring a machine condition are provided. An embodiment of the present invention provides a method of monitoring a machine condition, comprising the following steps: modeling a normal signal model performed by detecting a signal for monitoring condition of a normal machine and converting the detected signal to a normal signal model in time domain using a hidden Markov model (HMM) algorithm; calculating a probability value data of the monitoring signal at a subject machine performed by detecting a signal for monitoring condition of the subject machine in real-time and converting the detected signal to the probability value data relative to the normal state signal model using the HMM algorithm; and determining a section having deficiency where the probability value data of the monitoring signal at the subject machinery is not maintained constantly relative to the normal signal model.

19 Claims, 4 Drawing Sheets

METHOD OF MONITORING MACHINE CONDITION

CROSS-REFERENCE TO RELATED APPLICATIONS

This application claims priority to Korean Patent Application No. 10-2010-0012970 filed on Feb. 11, 2010 and Korean Patent Application No. 10-2010-0077026 filed on Aug. 10, 2010, the entire disclosures of which are incorporated herein by reference.

BACKGROUND

Non-destructive inspections, which apply monitoring signals such as electricity, ultrasound wave, etc. to a machine or mount sensors to detect and compare normal signals to the detected signals, can be used for monitoring machine conditions.

Hereinafter, a prior art method of monitoring a welding deficiency will be described as an example.

Arc welding systems using robots or automatic welding devices are broadly used in the industrial field. In an arc welding operation, welding deficiencies such as lack of fusion, blow holes, etc. can be caused by pre-processing inferiority of a welding spot, non-homogeneity of a welding rod, insufficient supply of welding gas, etc.

Considering the arc welding operation, it is difficult for an operator to monitor the welding operations continuously. Further, it is hard to optically find a welding deficiency such as a blow hole formed in the welding spot. Thus, even if the welding deficiency has occurred, it may not be monitored perfectly. For example, in a car manufacturing system, a door panel or a body frame of the car is press-molded and parts with various forms and sizes are welded thereto by a welding robot. Then, they will be painted and assembled. In these continuous manufacturing processes, the welding deficiencies may not be monitored substantially. Also, as another example, in welding operations of a thick metal plate of heavy machinery for construction, a welding line is welded repeatedly. If a deficiency occurs in a first welding operation, then it is hard to detect the deficiency since the deficiency is usually examined optically after the welding operations are completed. In order to monitor the deficiencies of a machine which cannot be detected optically, non-destructive inspection such as ultrasonic wave inspection, X-ray inspection, etc. can be performed. However, the non-destructive inspection may require much time and money. Further, it is hard to use the non-destructive inspection for monitoring the welding spot of the machine with a complicated shape.

Commercial arc-welding monitoring method is performed by detecting the feed speed of a welding wire, welding current and voltage during the welding operation. For example, an arc-welding monitoring method of the prior art comprises the following steps: detecting signals of welding current and voltage and feed speed of the welding wire in a normal welding state; detecting signals of welding current and voltage and feed speed of the welding wire in a subject welding spot; comparing the signals detected at the subject welding spot to the signals of the normal welding state; and determining a section having deficiency where signals in the subject welding spot are different from the signals in the normal welding state. Deficiency occurrence signals can be determined by a change of minimum value or average value of the current or voltage at the welding spot, an abnormal peak point, abnormal peak points per unit time, change of feed speed of the welding wire and the like. They can be observed optically and compared to the normal state signals.

FIG. 1 is a block diagram showing an example of a prior art arc-welding monitoring device. As shown in FIG. 1, the prior art arc-welding monitoring device includes a first controller 11 for an arc-welding power source 10, a power converter 12, a first voltage sensor 13 and a first current sensor 14. The device further includes elements, which are mounted on the outside of the arc-welding power source 10, such as a second controller 23, a second voltage sensor 21 and a second current sensor 22. They are electrically connected at the arc-welding spot 30. Thus, the second voltage sensor 21 and the second current sensor 22 can detect the change of the current and the voltage during the arc-welding operation. Then, the deficiency occurrence can be determined by comparing the changes of the current and the voltage to those of the normal welding state.

However, in a real welding state, irregular and significant noises are often generated. Further, the signals may fluctuate when the subject welding spot is welded normally. Thus, the prior art method may not precisely detect a deficiency.

SUMMARY

Various embodiments of a method for monitoring a machine condition are provided. In one embodiment of the present disclosure, by way of non-limiting example, the method of monitoring a machine condition comprises the steps of: modeling a normal signal model performed by detecting a signal for monitoring condition of a normal machine and converting the detected signal to data of the normal signal model in time domain using a hidden Markov model (HMM) algorithm; calculating a probability value data of the monitoring signal at a subject machine performed by detecting a signal for monitoring condition of the subject machine in real-time and converting the detected signal to the probability value data relative to the normal state signal model using the HMM algorithm; and determining a section having deficiency where the probability value data of the monitoring signal at the subject machinery is not maintained constantly relative to the normal signal model. Further, it is preferable that the method further comprises a step of updating the normal signal model to include the probability value data of a section determined as having deficiency when the deficiency has not occurred at the section.

Further, in another embodiment of the present disclosure, a method of monitoring a welding deficiency comprises the steps of: modeling a normal welding signal model performed by detecting welding signals at a welding portion in time domain during a welding operation, checking normal welding sections without deficiency, extracting a normal welding signal data from the normal welding sections, and converting the normal welding signal data to the normal welding signal model of the welding operation using a hidden Markov model (HMM); calculating probability value data of the welding signal at a subject welding portion relative to the normal welding signal model performed by detecting the welding signal at the subject welding portion in real-time and converting the detected signal at the subject welding portion to probability value data using the HMM algorithm; and determining a section having deficiency where the probability value data of the welding signal at the subject welding portion is not maintained constantly relative to the normal welding signal model. The welding signal can be voltage signal or current signal. The normal welding sections can be checked by at least one of an optical inspection, non-destructive inspection and a section inspection.

It is preferable that the normal welding signal is pre-processed to a time function by filtering or time weighting, etc. Further, the pre-processed normal welding signal can be converted to characteristic vector array by transformation. The characteristic vector array can be one or combination of a mean value, a standard deviation, a power spectral coefficient, a filter bank, a cepstral coefficient, a wavelet coefficient, a coefficient of auto-regressive (AR) model, etc.

It is also preferable that the welding signal detected at the subject welding portion is pre-processed to a time function by filtering or time weighting, etc. The pre-processed welding signal at the subject welding portion can be converted to characteristic vector array by the transformation. The characteristic vector array also can be one or combination of a mean value, a standard deviation, a power spectral coefficient, a filter bank, a cepstral coefficient, a wavelet coefficient, a coefficient of auto-regressive (AR) model, etc.

The normal welding signal model and the probability value data of the welding signal at the subject welding portion can be one of an initial probability, a state transition probability, a symbol observation probability, a state mean vector, and a state and covariance matrix. The HMM algorithm can be one of a forward/backward algorithm, a scaled forward/backward algorithm, a k-means clustering method, a modified k-mean clustering method, an expectation-maximize (EM) algorithm and a Baum-Welch algorithm.

The normal welding signal model for the welding operation time can be obtained by collecting a plurality of normal welding signal models at the normal welding sections extracted from one welding operation. Alternatively, the normal welding signal model for the welding operation time can be obtained by collecting a plurality of normal welding signal models at the normal welding sections extracted from a plurality of welding operations.

If the section determined as having the deficiency occurrence does not have deficiency, then the normal welding signal model can be updated to include the data of probability value in the section to the normal welding signal model.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skill in the art may realize that the following description is illustrative only and is not in any way limiting. Other illustrative embodiments may readily suggest themselves to such skilled persons having the benefit of this disclosure.

Figure 1:
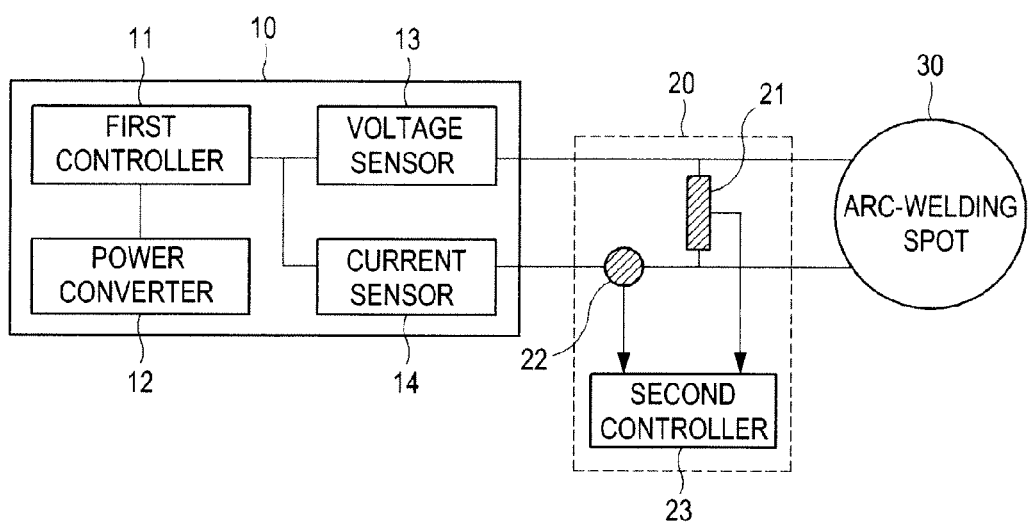
FIG. 1 is a block diagram illustrating an example of a prior art device for monitoring welding deficiency schematically.
Figure 2:
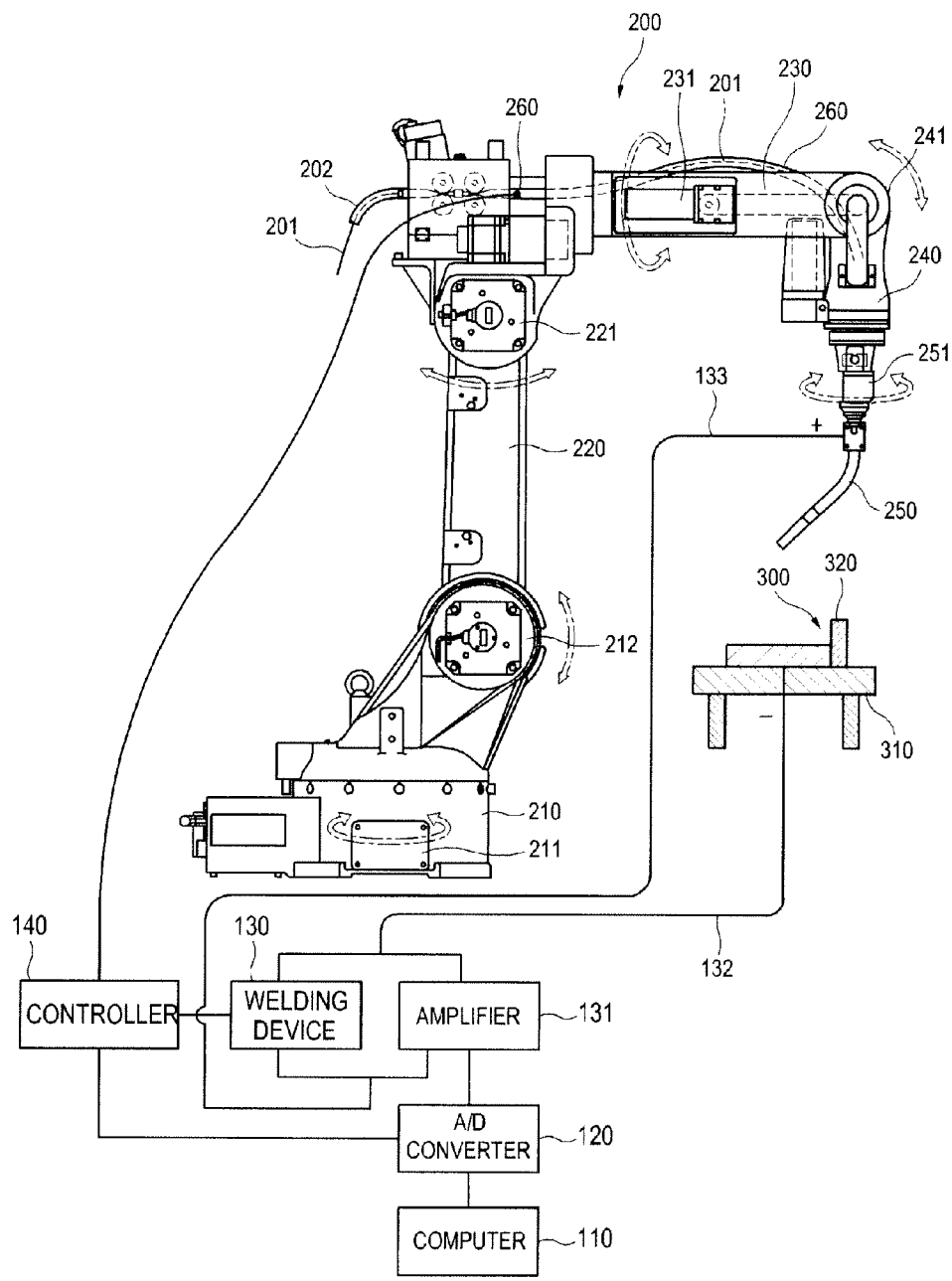
FIG. 2 is a conceptual diagram illustrating a welding device using a method of monitoring welding deficiency according to an embodiment of the disclosure.

FIG. 2 is a conceptual diagram showing an example of a welding device using a method of monitoring a welding deficiency according to an embodiment of the disclosure. As shown in FIG. 2, a welding robot 200 includes a plurality of arms 220, 230 and 240, which are extended from a base 210. The arms 220, 230, 240 have a plurality of rotatable joints 211, 212, 221, 231 and 241 to thereby move a welding torch 250 to a subject position. The welding torch 250 also has a joint 251. A welding wire 201 is guided to the welding robot 200 by a wire guide 202 while the welding wire 201 is fed to welding torch 250 by a torch cable 260.

The welding robot 200 comprises: a controller 140 adapted to control movement of the welding robot 200 and feed speed of the welding wire 201; a welding machine 130 including two terminals 132 and 133 which are connected to the welding torch 250 and a subject welding portion 300 fixed to the a jig 310; and a computer 110 including a user interface. Current and voltage can be detected at the two terminals 132 and 133 of the welding machine 130 during the welding operation. The detected current and voltage signals are amplified by the amplifier 131 and digitalized by an A/D converter 120 to be displayed on the computer 110 in real-time.

In order to measure the voltage at the subject welding portion 300, the two terminals are connected to a voltmeter in a parallel manner. To measure current at the subject welding portion 300, one of the terminals is connected to an amperemeter in a serial manner. Further, the computer 110 is connected to the controller 140 to thereby obtain information about welding operation (e.g., start of the welding operation, finish of the welding operation, information of the subject welding portion, information of the welding line, etc.).

The voltmeter and the amperemeter can be connected to the two terminals 132 and 133 of the welding machine 130. Thus, the welding voltage and the welding current can be measured in real-time or immediately after the welding operation. The signal feature of the welding current is different from the signal feature of the welding voltage. However, when a welding deficiency has occurred during the welding operation, the signal features are changed simultaneously. Thus, analyzing results using a hidden Markov model (HMM) algorithm are similar to each other. Accordingly, one of them can be selected to analyze the welding deficiency.

A HMM algorithm is usually used for analyzing voice recognition. In voice recognition, various voice signal models are formed previously. When an arbitrary voice signal is inputted, the probability values of the inputted signal relative to the respective voice signal models are calculated by the HMM algorithm. Then, the voice signal model corresponding to the highest probability value is deemed as the inputted voice signal. In this embodiment, this HMM algorithm is applied to techniques for monitoring defects resulting from welding.

To monitor the welding deficiency, only a normal welding state model is needed. After the modeling of the normal welding state model, probability value data of the welding signal at the subject welding portion relative to the normal welding state model are calculated continuously. Thus, if the welding operation at the subject welding portion is performed normally, then the calculated probability values of the welding signal relative to the normal welding state are maintained at relatively high value stably with little fluctuation in time. On the contrary, if there is a deficiency at the subject welding portion, then the probability values relative to the normal state model may drop rapidly. Thus, if there is a section where the calculated probability values are considerably dropped, then the section can be determined to have a weld deficiency.

Hereinafter, referring to FIGS. 3 and 4, a process of modeling the normal welding signal model and monitoring the deficiency occurrence during the welding operation is discussed in detail.

Figure 3:
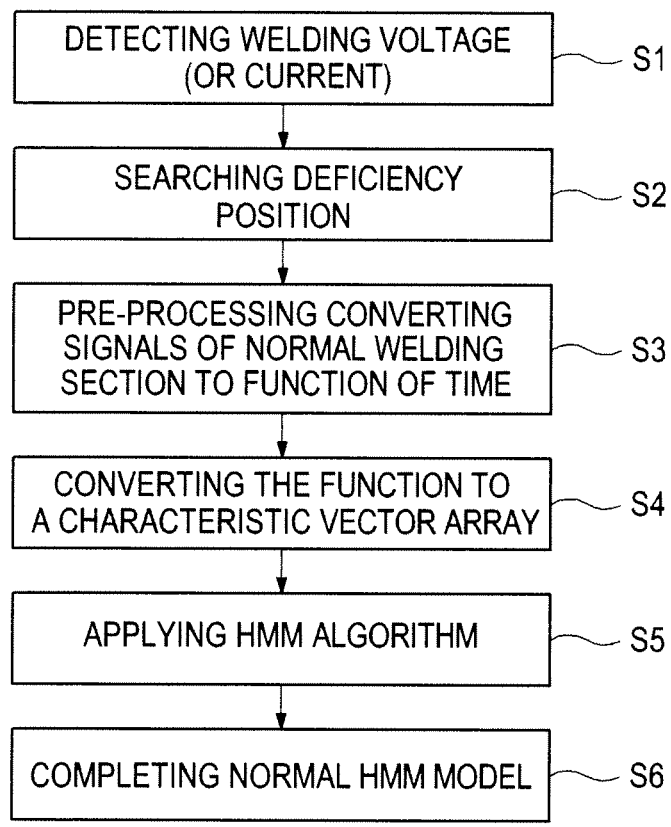
FIG. 3 is a flow chart for modeling a normal welding model according to the method for monitoring welding deficiency according to an embodiment of the disclosure.

FIG. 3 shows a modeling process of the normal welding signal model. As shown in FIG. 3, a welding current signal (or welding voltage signal) is detected at the terminals of the welding machine 130 of a welding robot 200 during the welding operation in the time domain, S1. After the welding operation, the welded portion such as the weld line is inspected by an optical inspection, non-destructive inspection, a section inspection and the like, S2. Whether the welded line has a deficiency can be determined by the inspection. Further, the precise positions of the deficiency occurrence during the welding operation can be also determined by the inspection.

The feature of the welding current signal (or welding voltage signal) can be magnified in the time domain by a pre-process (e.g., filtering or time weighting) for making data of the normal signal sections, S3. After the pre-process, the data of the normal welding signal section can be converted to a characteristic vector array (e.g., a mean value, a standard deviation, power spectral coefficient, filter bank, cepstral coefficient, wavelet coefficient, coefficient of auto-regressive (AR) model, etc.) by a transformation that can extract the signal feature involved in the data, S4. To obtain HMM parameter, a HMM algorithm (e.g., a forward/backward algorithm, a scaled forward/backward algorithm, a k-means clustering method, a modified k-mean clustering method, an expectation-maximize (EM) algorithm, Baum-Welch algorithm, etc.) can be applied to the characteristic vector array, S5. The result according to the selected algorithm can be a normal HMM model of normal welding state (i.e., normal welding state model), S6.

Figure 4:
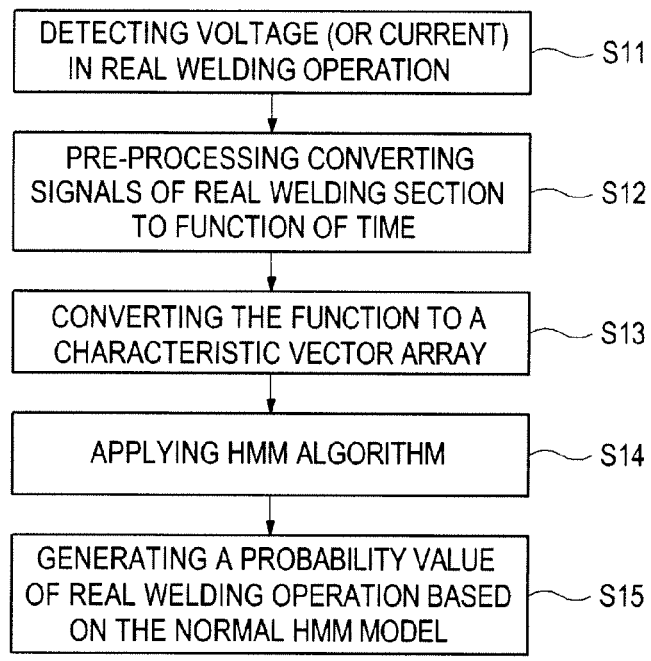
FIG. 4 is a flow chart for calculating a probability value of a welding signal at the subject welding portion of the method for monitoring welding deficiency according to an embodiment of the disclosure.

FIG. 4 shows a process to obtain probability value data of the welding signal at the subject welding portion. As shown in FIG. 4, when the subject welding portion is welded, the current or voltage is detected during welding operation at the subject welding portion, S11. For example, in order to obtain 10 KHz signal data in the time domain, 2,000 sampled data are needed per 0.2 sec. These data are pre-processed to a time function by a pre-process such as filtering, time weighting, etc. S12. The time function is converted to the characteristic vector array (e.g., a mean value, a standard deviation, power spectral coefficient, filter bank, cepstral coefficient, wavelet coefficient, coefficient of auto-regressive (AR) model, etc.) by the transformation used in the step S4, S13. The HMM algorithm used in the step S5 is applied to the converted characteristic vector array, S14. The result obtained from the step S14 is completed as the probability value data of the welding signal at the subject welding portion relative to the normal welding signal model, S15.

If the time range of the normal signal section is shorter than the welding time of the welding operation at the subject welding portion, then the normal signal section can be used continuously several times to obtain a normal welding signal model corresponding to the probability value data for the welding operation at the subject welding portion.

Generally, a difference between the maximum value and the minimum value of the probability value data calculated by the HMM algorithm is very considerable. Thus, the logarithmic value of the probability value can be used. Logarithmic data of the probability value data can be calculated during the entire welding operation.

Figure 5:
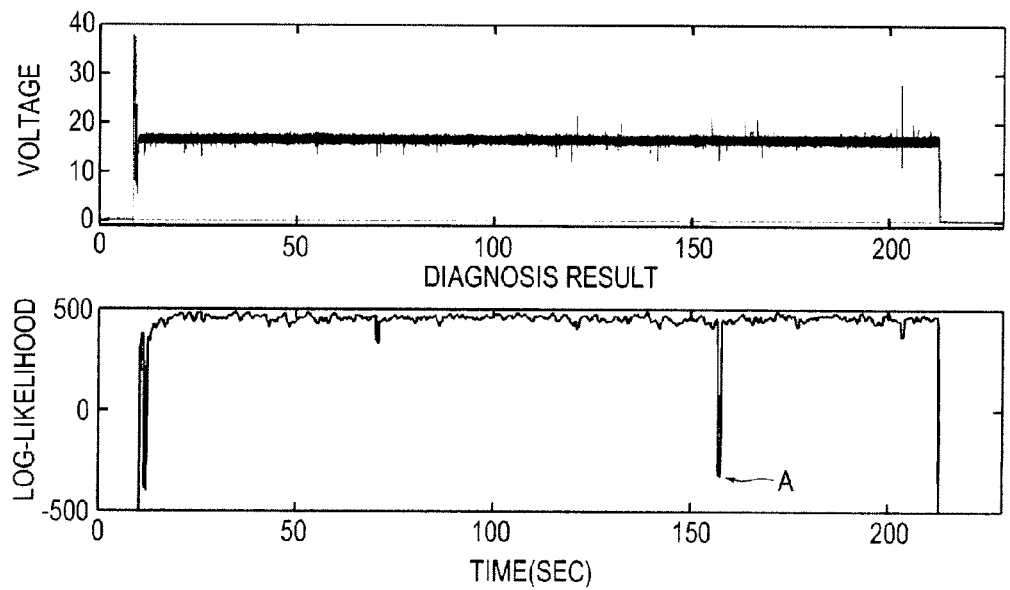
FIG. 5 shows a voltage graph at the subject welding portion and a graph of a probability value of a welding signal at the subject welding portion in time axis which is obtained by the process of FIG. 4.

FIG. 5 shows a graph of a voltage signal at the subject welding portion and a graph of the probability values obtained at the subject welding portion. If the welding operation at the subject welding portion is performed without deficiency, then the probability value data of the welding signal at the subject welding portion are uniform except the initial and final sections. As shown in FIG. 5, if there is a deficiency, then the probability value drops considerably forming a huge downward peak A. The section having a huge peak A can be determined as a section with deficiency occurrence.

The welding signal involves many noises. However, the considerable peak fluctuation of the probability values calculated by the HMM algorithm is occurred at the section which has the high probability of deficiency.

If the welding operation is performed normally, then the feature of the welding signal can be changed by various factors such as a condition or pre-process of the subject welding portion, non-uniform quality of the welding wire, etc. Thus, the modeling process of making the normal welding signal model can be performed by using one normal welding signal model of a normal welding section repeatedly or by using normal welding signal models collected from the data of normal signal models at the normal welding sections extracted from one welding operation or by using normal welding signal models collected from the data of normal welding sections extracted from welding operations at the same welding line.

The determination of the deficiency occurrence in real welding operation can be improved gradually. For example, in earlier monitoring work for finding the welding deficiency, the graph of probability values at the subject welding portion relative to an appropriate normal signal model can fluctuate in partial or whole section of the welding portion. The fluctuated section can be determined as a section having a deficiency occurrence. It is usually caused by various reasons such as the condition of the welding surface, non-uniform material property of a welding rod, etc., which can change the feature of welding current or welding voltage. Thus, after inspection, if there is not any deficiency at the fluctuated section, then the normal welding signal model is updated to include the fluctuated probability value data at the section to thereby form a new normal welding signal model. Such fluctuation can be determined as a normal welding signal by the update of the normal welding signal model. Thus, the normal welding signal model can be strengthened gradually.

The above embodiment described the method of monitoring a welding deficiency. However, the disclosure is not limited thereto and can be applied to a technical field of monitoring a machine condition or deficiency.

Although embodiments have been described with reference to a number of illustrative embodiments thereof, it should be understood that various other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of monitoring a machine condition, the method comprising:
  modeling a normal signal model performed by detecting a signal for monitoring a condition of a normal machine and converting the detected signal to data of the normal signal model in a time domain using a hidden Markov model (HMM) algorithm;

calculating a probability value data of the monitoring signal at a subject machine performed by detecting a signal for monitoring a condition of the subject machine in real-time and converting the detected signal to the probability value data relative to the normal signal model using the HMM algorithm;

determining a section having a deficiency where the probability value of the monitoring signal at the subject machine is not maintained constantly relative to the normal signal model; and updating the normal signal model to include the probability value data of a section determined to have the deficiency when the deficiency does not occurred at the section.

2. A method of monitoring a welding deficiency, comprising modeling a normal welding signal model performed by detecting welding signals at a welding portion in a time domain during a welding operation, checking normal welding sections without a deficiency, extracting a normal welding signal data from the normal welding sections, and converting the normal welding signal data to the normal welding signal model of the welding operation using a hidden Markov model (HMM);

calculating probability value data of the welding signal at a subject welding portion relative to the normal welding signal model performed by detecting the welding signal at the subject welding portion in real-time and converting the detected signal at the subject welding portion to the probability value data using the HMM algorithm; and determining a section having a deficiency where the probability value data of the welding signal at the subject welding portion is not maintained constantly relative to the normal welding signal model.

3. The method of claim 2, wherein the welding signal is a voltage signal.

4. The method of claim 2, wherein the welding signal is a current signal.

5. The method of claim 2, wherein the normal welding sections are checked by at least one of an optical inspection, non-destructive inspection and a section inspection.

6. The method of claim 2, wherein the normal welding signal data is pre-processed to a time function.

7. The method of claim 6, wherein the normal welding signal data is pre-processed by filtering or time weighting.

8. The method of claim 6, wherein the pre-processed normal welding signal data is converted to characteristic vector array by a transformation.

9. The method of claim 8, wherein the characteristic vector array is one or combination of a mean value, a standard deviation, a power spectral coefficient, a filter bank, a cepstral coefficient, a wavelet coefficient and a coefficient of auto-regressive (AR) model.

10. The method of claim 2, wherein the normal welding signal model and the probability value data of the welding signal at the subject welding portion are one of an initial probability, a state transition probability, a symbol observation probability, a state mean vector and a state and covariance matrix, and wherein the HMM algorithm is one of a forward/backward algorithm, a scaled forward/backward algorithm, a k-means clustering method, a modified k-mean clustering method, an expectation-maximize (EM) algorithm and a Baum-Welch algorithm.

11. The method of claim 2, wherein the welding signal detected at the subject welding portion is pre-processed to a time function.

12. The method of claim 11, wherein the welding signal detected at the subject welding portion is pre-processed by filtering or time weighting.

13. The method of claim 11, wherein the pre-processed welding signal at the subject welding portion is converted to characteristic vector array by a transformation.

14. The method of claim 13, wherein the characteristic vector array is one or combination of a mean value, a standard deviation, a power spectral coefficient, a filter bank, a cepstral coefficient, a wavelet coefficient and a coefficient of auto-regressive (AR) model.

15. The method of claim 2, wherein the normal welding signal model for a welding operation time is obtained by collecting a plurality of normal welding signal models at the normal welding sections extracted from one welding operation.

16. The method of claim 2, wherein the normal welding signal model for a welding operation time is obtained by collecting a plurality of normal welding signal models at the normal welding sections extracted from a plurality of welding operations.

17. The method of claim 2, wherein if the section determined as having the deficiency does not have deficiency, then the normal welding signal model is updated to include the probability value data.

18. A method of monitoring a welding deficiency, comprising:

modeling a normal welding voltage signal model performed by detecting welding voltage signals at a welding portion in a time domain during a welding operation, checking normal welding sections without a deficiency, extracting a normal welding voltage signal data from the normal welding sections, and converting the normal welding voltage signal data to the normal welding voltage signal model of the welding operation using a hidden Markov model (HMM);

calculating probability value data of the welding voltage signal at a subject welding portion relative to the normal welding voltage signal model performed by detecting the welding voltage signal at the subject welding portion in real-time and converting the detected signal at the subject welding portion to the probability value data using the HMM algorithm; and determining a section having a deficiency where the probability value data of the welding voltage signal at the subject welding portion is not maintained constantly relative to the normal welding voltage signal model, wherein the normal welding voltage signal data is pre-processed to a time function and the pre-processed normal welding voltage signal data is converted to a characteristic vector array by a transformation, and wherein the welding voltage signal detected at the subject welding portion is pre-processed to a time function, and the pre-processed welding voltage signal at the subject welding portion is converted to a characteristic vector array by the transformation.

19. A method of monitoring a welding deficiency, comprising:

modeling a normal welding current signal model performed by detecting welding current signals at a welding portion in a time domain during a welding operation, checking normal welding sections without a deficiency, extracting a normal welding current signal data from the normal welding sections, and converting the normal welding current signal data to the normal welding current signal model of the welding operation using a hidden Markov model (HMM);

calculating probability value data of the welding current signal at a subject welding portion relative to the normal welding current signal model performed by detecting the welding current signal at the subject welding portion in real-time and converting the detected signal at the subject welding portion to the probability value data using the HMM algorithm; and determining a section having a deficiency where the probability value data of the welding current signal at the subject welding portion is not maintained constantly relative to the normal welding current signal model, wherein the normal welding current signal data is pre-processed to a time function and the pre-processed normal welding current signal data is converted to a characteristic vector array by a transformation, and wherein the welding current signal detected at the subject welding portion is pre-processed to a time function, and the pre-processed welding current signal at the subject welding portion is converted to a characteristic vector array by the transformation.

* * * * *